United States Patent [19]

Scuri

[11] Patent Number: 5,057,258
[45] Date of Patent: Oct. 15, 1991

[54] METHOD FOR MANUFACTURING ELASTOMERIC FORM LINERS USING SEGMENTS OF TIRE TREAD

[76] Inventor: Vicki B. Scuri, Suite 175, 1817 N. 7th St., Phoenix, Ariz. 85006

[21] Appl. No.: 410,710
[22] Filed: Sep. 22, 1989
[51] Int. Cl.$^5$ .................... B29C 41/02; B29C 39/02
[52] U.S. Cl. .................... 264/138; 249/112; 249/134; 264/227; 264/300; 264/313; 425/DIG. 44
[58] Field of Search .................... 249/112, 114.1, 134, 249/189; 264/219, 220, 225, 226, 227, 300, 313, 138; 425/440, DIG. 44

[56] References Cited

U.S. PATENT DOCUMENTS

| | | | |
|---|---|---|---|
| 3,379,812 | 4/1968 | Yakovou | 264/227 |
| 4,185,056 | 1/1980 | Detwiler | 264/220 |
| 4,500,375 | 2/1985 | Goldstein | 264/220 |
| 4,798,364 | 1/1989 | Scott | 264/225 |

FOREIGN PATENT DOCUMENTS

| | | | |
|---|---|---|---|
| 1909855 | 11/1970 | Fed. Rep. of Germany | 264/225 |
| 52-43869 | 4/1977 | Japan | 264/219 |
| 2040214 | 8/1980 | United Kingdom | 264/220 |

OTHER PUBLICATIONS

"Architectural Textured Concrete Walls," L. M. Scofield Company information sheet.
"Specification for Lithotex Formliners," L. M. Scofield Company information sheet.
"Suggested Generic Specification for Lithotex Formliner," L. M. Scofield Company information sheet, Apr. 25, 1985.
"Lithotex Elastomeric Formliners," L. M. Scofield Company brochure, 1987.
"Design-Plus Form Liners," Burke Company brochure, Mar. 1988.
"Flex Liner Elastomeric Form Liner Specification Sheet," The Scott System, Inc. information sheet, Aug. 1985.
"Scott-Lease 440 Release Agent Specification Sheet," The Scott System, Inc. information sheet, Jun. 1985.
"Red-Flex Elastomeric Form-Liner with the Exclusive Hydro Seal Edge," The Scott System, Inc. brochure.
"Instructions for the Use of Flex-Liner and Red-Flex," The Scott System, Inc. information sheet.
"Flex-Liner Elastomeric," The Scott System, Inc. brochure.
"Red-Flex Elastomeric," The Scott System, Inc. brochure.
"Flex-Liner/Red-Flex Standard Look and Sizes," The Scott System, Inc. brochure.
"Field Lamination Instructions for Scott System Flex--Liner & Red-Flex," The Scott System, Inc. brochure.
"Flex-Liners by Scott/Guaranteed for 100 Reuses," The Scott System, Inc. brochure.
"Scott Strips by Scott System, Inc.," The Scott System, Inc. brochure.
"Concrete Graphics," The Scott System, Inc. brochure.
"Application Guide/Symons Dura-Tex Form Liner," Symons Corporation brochure, 1986.
"Architectural Form Liners and Concrete Forming Systems," Symons Corporation brochure, 1984.
"Spec Data," Symons Corporation information sheet, Aug. 1983.
"Stamprite Presents Platform Tools/The Third Dimensions," Stamprite Enterprises, Inc. brochure.
"Pavernite Stamped Concrete/Gateway to The Third Dimension/the Natural Look," Pavernite, Inc. brochure.

Primary Examiner—Jan H. Silbaugh
Assistant Examiner—Mathieu Vargot
Attorney, Agent, or Firm—Christensen, O'Connor, Johnson & Kindness

[57] ABSTRACT

Segments of tire tread are utilized as patterning elements to produce elastomeric form liners useful for creating designs on poured concrete structures. The segments of tire tread are arranged in the interior of an open-faced mold box, and liquified elastomeric material is poured into the mold box and allowed to solidify. An elastomeric form is then separated from the mold box. This form may be used itself as a form liner, but is preferably used as a mold to produce further generations of forms and form liners. The form liners are used to line the interior of a concrete form, and the tread patterns are thereby imparted to the surface of the resulting concrete structure.

11 Claims, 5 Drawing Sheets

METHOD FOR MANUFACTURING ELASTOMERIC FORM LINERS USING SEGMENTS OF TIRE TREAD

TECHNICAL FIELD

This invention is directed to the manufacture of elastomeric form liners of the type used to create poured concrete structures.

BACKGROUND OF THE INVENTION

In the construction of concrete structures, the use of elastomeric form liners can greatly enhance the aesthetic appeal of the completed structure. An elastomeric form liner is a flexible mold which can be used to impart texture, shape, or pattern to a poured concrete structure. Generally, the elastomeric form liner is attached to a rigid backing and used as a poured-in-place framing apparatus. The poured concrete will conform to the particular shape or texture of the elastomeric form liner and solidify while holding that shape. Alternatively, the form liners can be used in pre-casting concrete panels apart from the final structure for use as decorative segments. In the prior art, it is well known that form liners having textures simulating wood, brick, or stone are available. While form liners that provide such textures are useful, they are generally limited in their design scope.

SUMMARY OF THE INVENTION

The present invention is based on the use of segments of tire tread to produce elastomeric form liners. A large variety of tire tread patterns may be found in conventional automobile tires, motorcycle tires, or even tractor tires. The use of tire tread creates an interesting visual effect combining the repetitive pattern within a single segment of tire tread with the variation associated with using the multiple types of tire tread avilable.

In accordance with a first embodiment of the invention, a method for producing elastomeric form liners using segments of tire tread is disclosed. The process involves positioning a tire tread segment in a mold box, and then pouring a liquid elastomeric material over the tire tread segment in the mold box. The elastomeric material is allowed to solidify into an elastomeric form, whereupon the form is separated from the tire tread segment. The form may then be used as a form liner to line the interior of a form for a poured concrete structure, or for a structure formed from other poured materials. The tire tread pattern will thereby be imparted to a surface of such structure. Alternately, the form may be used to produce one or more further generations of forms. For example, the form may be positioned in a second mold box, and liquid elastomeric material may then be poured over the first form, and allowed to solidify into a second form. The second form may be used as a form liner, or may be used to produce further forms, etc. At any stage, two or more forms derived from different tire tread segments can be combined in a single mold box to produce a subsequent form or form liner. The invention can thereby be used to produce an extremely large number of patterns on a concrete structure.

DETAILED DESCRIPTION OF THE PREFERRED EMBODIMENT

Figure 1:
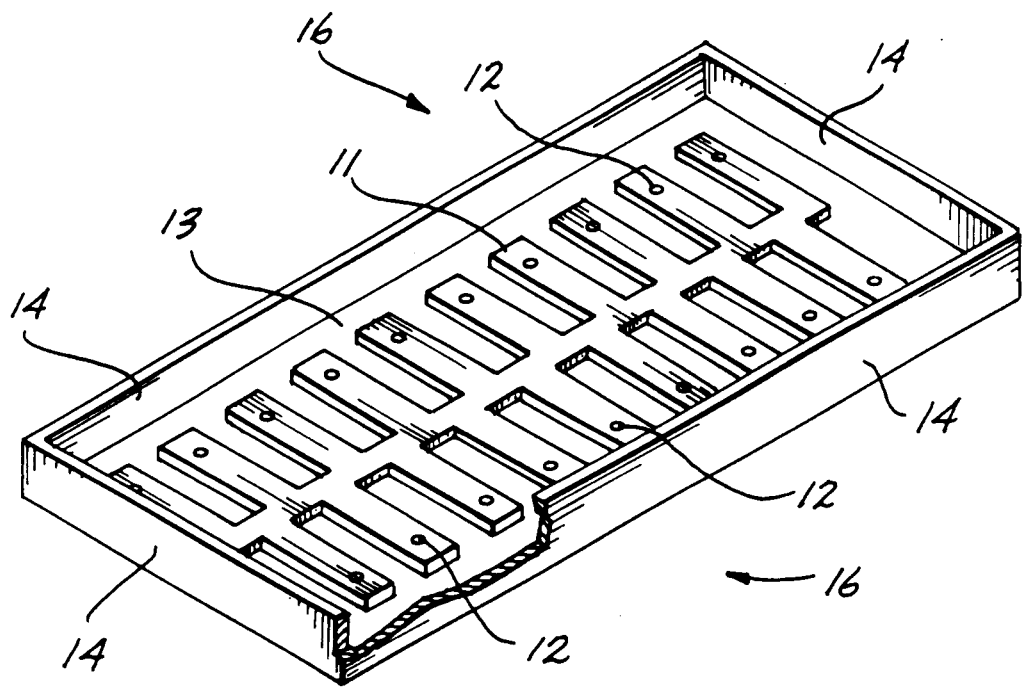
FIG. 1 shows pictorially a mold box for use in producing a form from a tire tread pattern in accordance with the present invention.

A preferred embodiment of the method of the present invention is illustrated in FIGS. 1. through 10. Referring initially to FIG. 1, one or more tire tread segments 11, each having a first surface defining a pattern of tread channels, are cut from automobile or other vehicle tires, and are then positioned on board 13 in a desired pattern. Tread segment 11 is then secured to board 13 by nails 12, or by any other suitable means such as an adhesive. Board 13 should be of such strength as to fully and rigidly support the tread segment. In one embodiment, it has been found that high density overlay board is suitable, however, it will be appreciated that many other materials are equally effective. The overall size of tread segment 11 and of board 13 may be freely varied to match the desired final product. However it will often be found preferable to keep the overall size of tread segment 11 and board 13 relatively small, to facilitate handling of the form liners to be produced. For example, a convenient size for board 13 for a modular design is 1 foot by 2 feet However, much larger form lines can also be produced.

Figure 2:
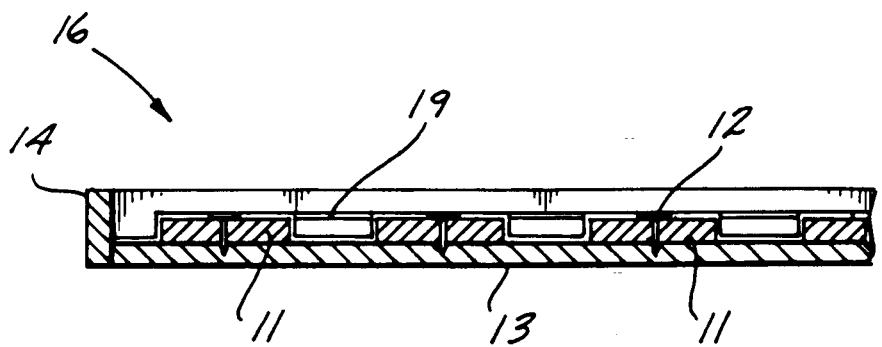
FIG. 2 shows partial cross-sectional view of FIG. 1.

After the initial attachment of tire tread segment 11 to board 13, any cosmetic blemishes on the treads may be repaired by the use of pliable modeling clay. modeling clay may also be used to fill the depressions caused by nails 12. A right rectangular parallelepiped box is then formed by attaching four sides 14 to board 13, such that an open mold box 16 is formed. The attachment of sides 14 to board 13 may be done using adhesives or other attachment methods. Sides 14 should generally be $\frac{1}{4}''-\frac{1}{2}''$ higher than tread segment 11, for reasons that will be made clear below. The resultant structure can be seen in FIG. 1 pictorially and in FIG. 2 in cross section.

Figure 4:
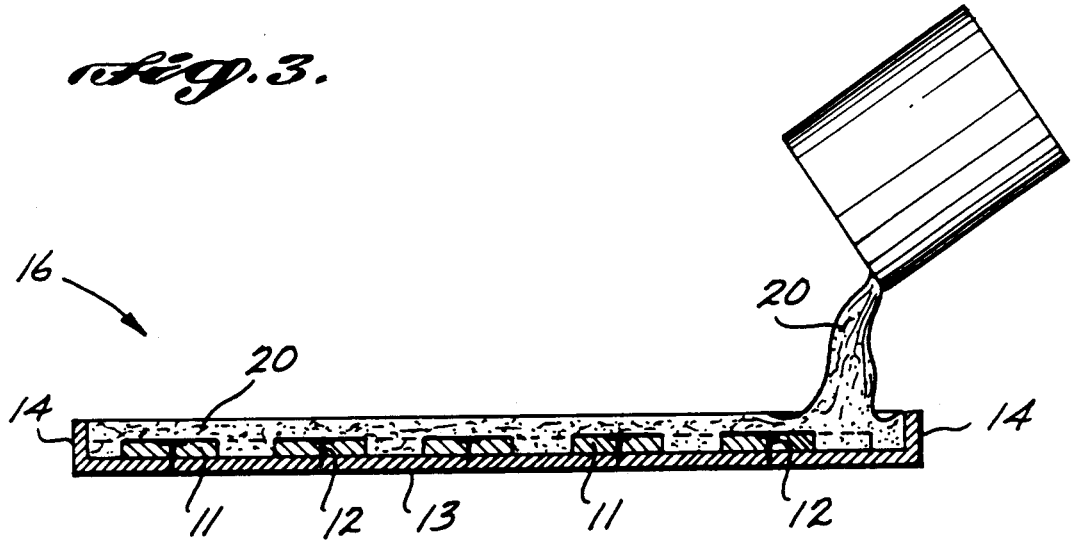
FIGS. 4 through 7 pictorially show steps in the manufacture of the first negative and positive elastomeric forms based upon the tread pattern shown in FIG. 1.

The next step is the application of a releasing agent 19 to the inner surface of the mold box 16 and the exposed surface of tire tread segment 11. The releasing agent may be sprayed on the exposed surfaces, and then rubbed into the surfaces to ensure complete coverage. The releasing agent 19 acts to facilitate the separation between the mold box 16 and the elastomeric form described below. Referring to FIG. 4, after the releasing agent 19 has been applied, a liquid elastomeric material 20 is poured into mold box 16. The depth of the liquid elastomeric material 20 can be seen to be limited by the height of the sides 14. Preferably, liquid elastomeric material 20 completely submerges tire tread segment 11 by $\frac{1}{4}''-\frac{1}{2}''$ or more.

Figure 5:
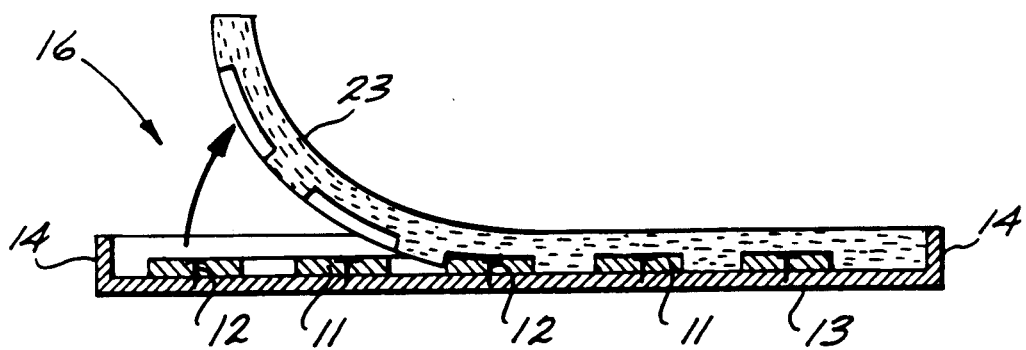

The liquid elastomeric material 20 is then allowed to cure into a flexible solid, at which time a first negative elastomeric form 23 is separated from mold box 16, as seen in FIG. 5. A "negative" is the spatial opposite of the original segment of tire tread. The original shape, or any form having the shape of the original, is referred to as a "positive." As noted above, the separation of form 23 from the mold box 16 is facilitated by the use of a releasing agent 19. Form 23 is then cleaned, by the use of a knife or other tool, by removing any undercutting or other aesthetic blemishes. Undercutting can best be described as the result of leakage of the liquid elastomeric material 20 into the interstices between tire tread segment 11 and the board 13.

Figure 3:
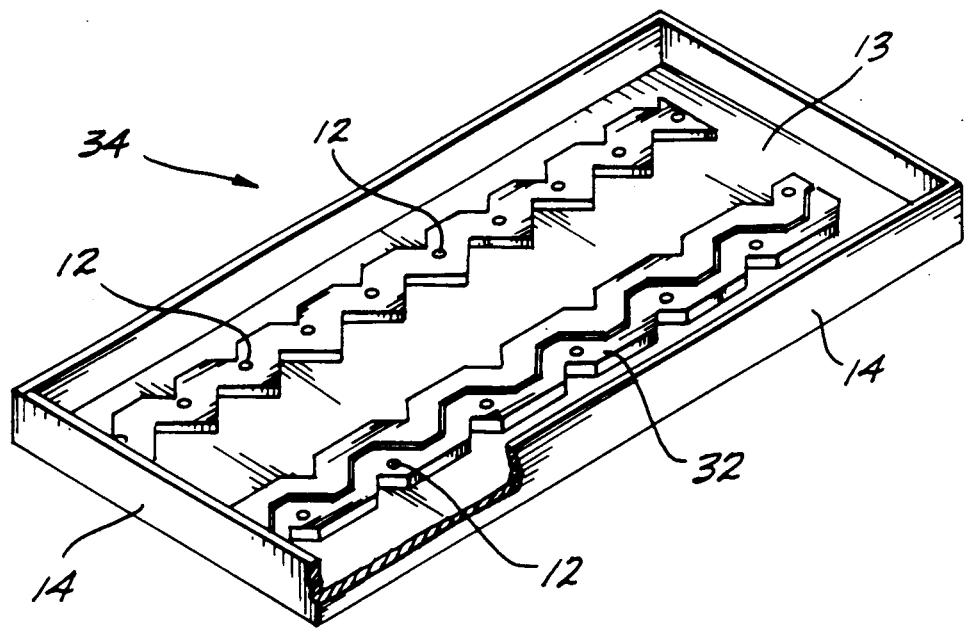
FIG. 3 shows a mold box using different tread segments.

FIG. 3 illustrates the first step in the creation of a form according to the present invention, starting from a pair of different tire tread segments 30 and 32. As with the emmbodiment shown in FIG. 1, segments 30 and 32 are secured to board 13 by nails 12, and a mold box 34 is then formed by the use of sides 14. Any number of treads can be combined in this manner to produce a desired pattern. Given the large number of tire tread patterns available, it can be seen that an extremely wide variety of forms and form liners may be produced using the technique of the present invention. When multiple treads segments are used in a single mold box, the liquid elastomeric material 20 should cover the highest tread segment by $\frac{1}{4}''-\frac{1}{2}''$.

Figure 6:
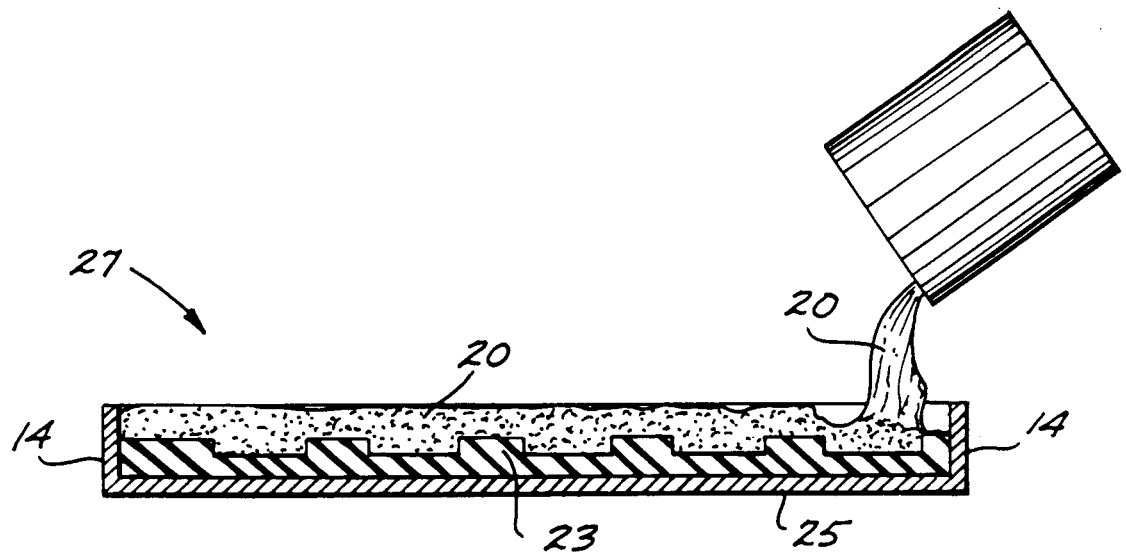
Figure 7:
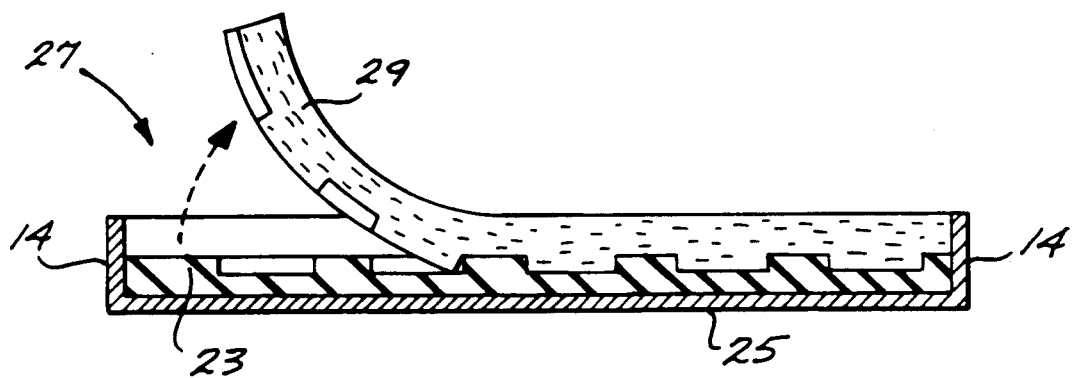

The use of a single set of tire tread segments, such as segment 11 or segments 30 and 32, to produce a large number of the elastomeric forms can be difficult, because the liquid elastomeric material 20 will tend to deteriorate the segments of tire tread, such that the patterns will become blurred. In addition, the production of a form from tire tread segments is relatively time consuming, since it involves the steps of removing the tread segment from a tire, securing the tread segment to an underlying board, removing imperfections in the tread, and the removal of undercutting and other flaws from the form. For these reasons, form 23 is preferably not used directly as a form liner, but is instead used to produce additional generations of forms. The production of a second generation form is illustrated in FIGS. 6 and 7. The cleaned negative elastomeric form 23 is positioned on board 25, and adhesively attached thereto. Board 25 may be of similar shape and composition as the first board 13. A second mold box 27 is constructed around board 25 using sides 14, in a manner similar to mold box 16 in FIG. 1. Once again, sides 14 are of sufficient height to extend vertically above elastomeric form 23 by at least $\frac{1}{4}''-\frac{1}{2}''$.

Next, the inner surface of the second mold box 27 and the exposed surface of the first elastomeric form are coated with a releasing agent. As seen in FIG. 6. liquified elastomeric material 20 is then poured into second mold box 27. The depth of the liquid elastomeric material 20 is preferably greater than the greatest height of form 23 by $\frac{1}{4}''-\frac{1}{2}''$. The liquified elastomeric material 20 is then allowed to solidify, at which time a second elastomeric form 29 is separated from the first elastomeric form 23, as seen in FIG. 7. It will be appreciated that form 29 is now a positive impression of the original segments of tire tread.

Figure 8:
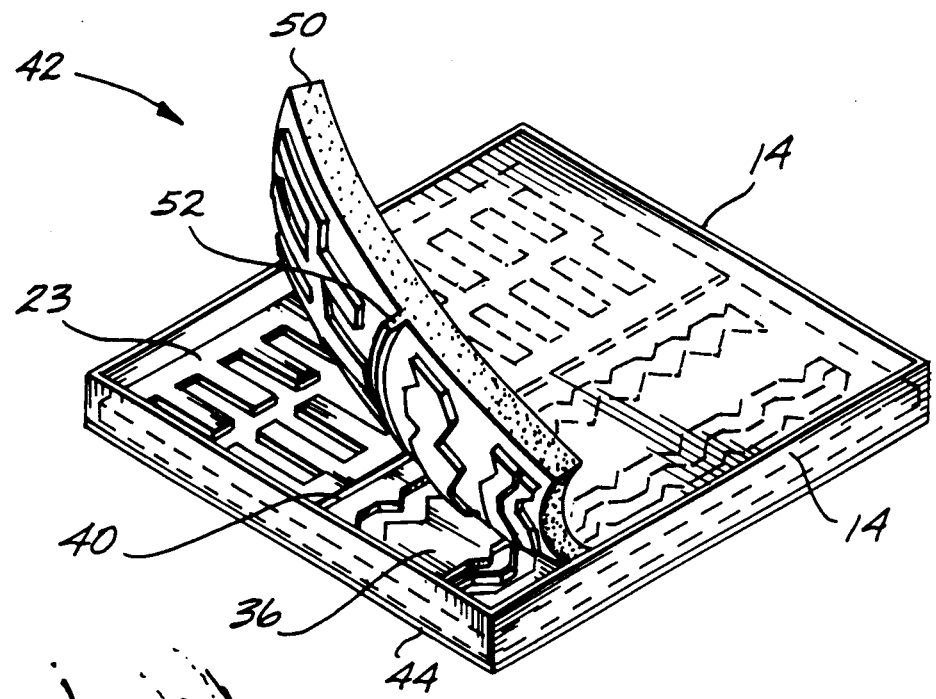
FIG. 8 shows the production of a master form using two different negative forms.

Either form 23 (FIG. 5) or form 29 (FIG. 7) could be used as a "master" form, to generate a large number of form liners, the choice between forms 23 and 29 depending upon whether one wishes the finished concrete structure to have positive or negative relief with respect to the original tread pattern. Alternately, various conbinations of positive or negative forms can be used to generate further master forms. For example, FIG. 8 illustrates the use of a pair of negative forms to create a master, positive form. In this illustration, negative form 23 produced as shown in FIG. 5 is placed in mold box 42 formed from overlay board 44 and sides 14. Negative form 36 is also placed in mold box 42, negative form 36 corresponding to the form created starting with tread segments 30 and 32 shown in FIG. 3. A rectangular wood strip 40 may be placed between forms 23 and 36, in order to create a rustication strip, i.e., a linear depression in the finished concrete structure. Triangular wood strips (not shown) may also be positioned in mold box 42, to create beveled edges. Mold box 42 is then used to create master form 50, using the techniques described above. Form 50 includes recessed rustication strip 52 corresponding to wood strip 40.

Figure 9:
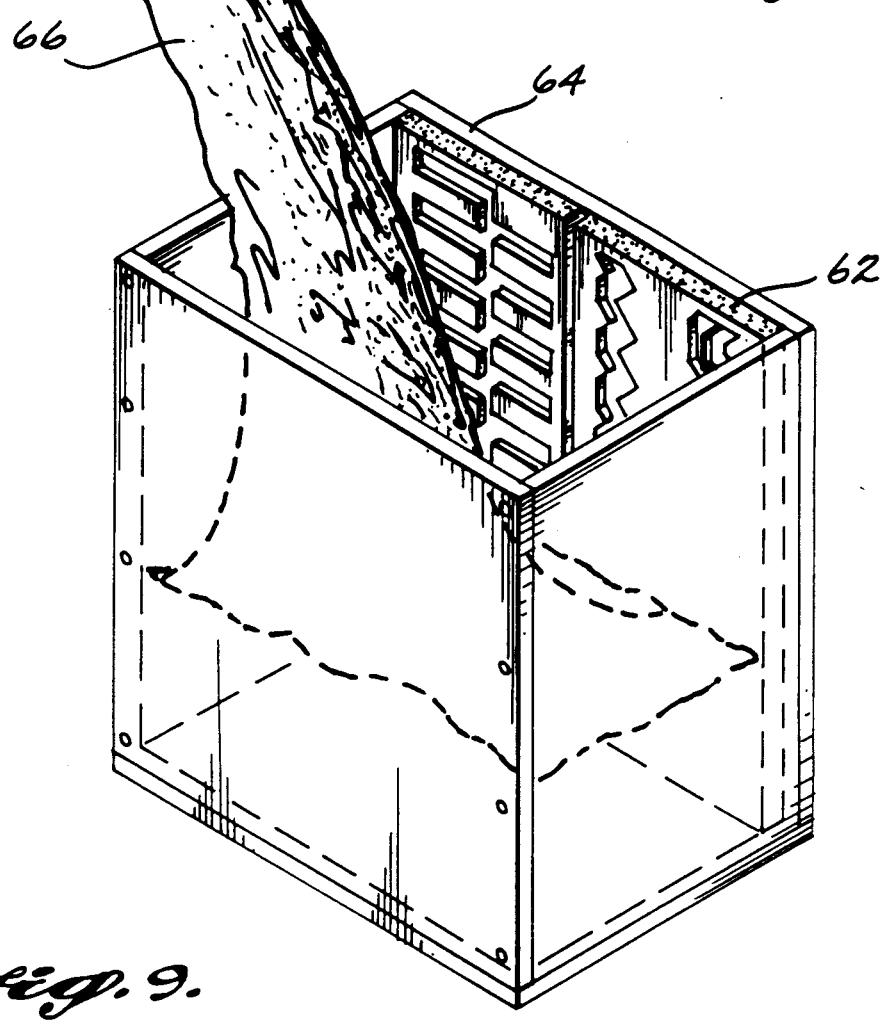
FIG. 9 shows the pouring of a concrete structure using a form liner produced in accordance with the present invention.

FIG. 9 presents a simplified illustration of the creation of a concrete structure coresponding to master form 50. Master form 50 is first used to generate form liner 62, using a process identical to that illustrated and described above with respect to FIGS. 6 and 7. Form liner 62 is therefore the negative of form 50. Form liner 62 is then used to line the interior of concrete form 64, and concrete 66 is then poured into the form and allowed to set. After setting, form 64 is removed along with form liner 62, leaving a surface of the finished concrete structure having the tread patterns corresponding to tire tread segments 11 shown in FIg. 1, and tread segments 30 and 32 shown in FIG. 3.

Figure 10:
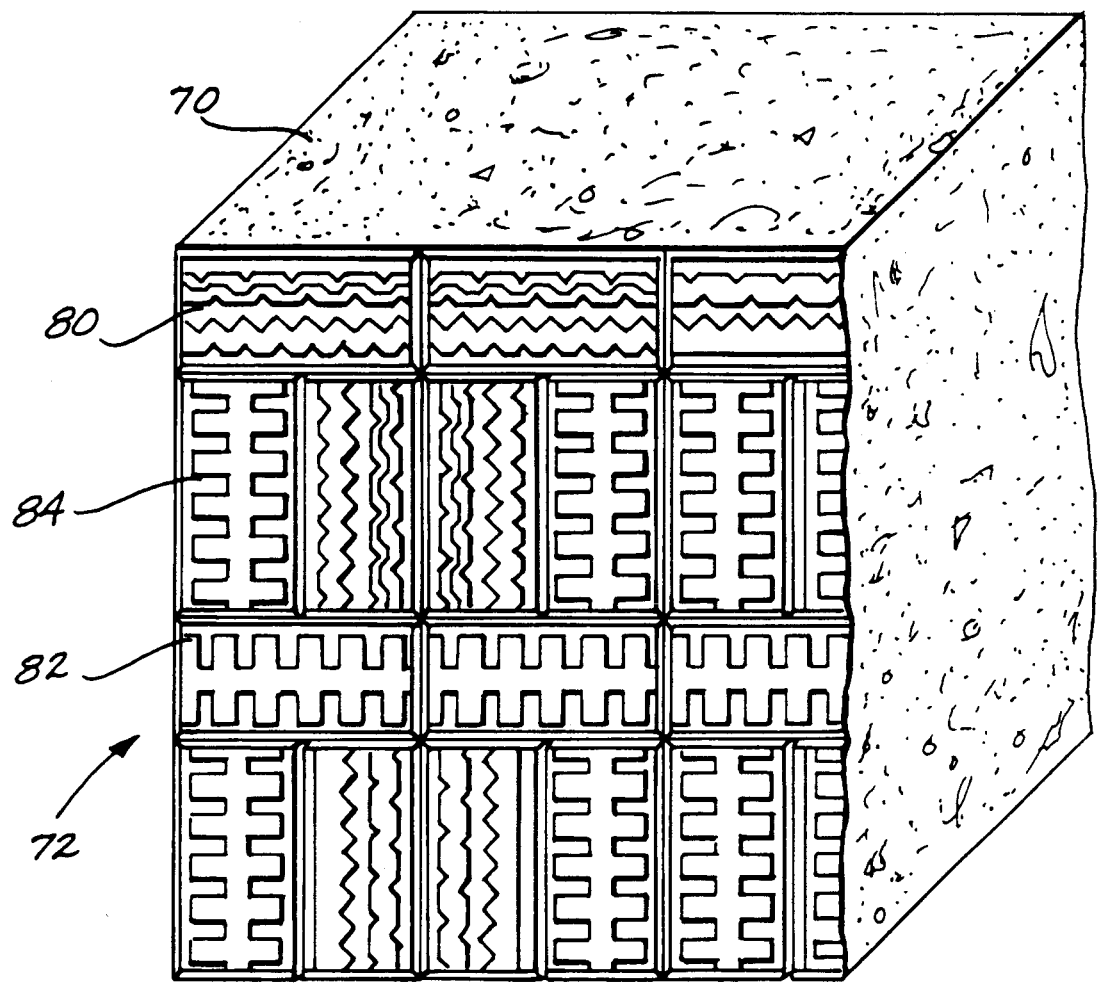
FIG. 10 illustrates a concrete structure formed according to the present invention.

FIG. 10 schematically illustrates the way in which form liners generated in accordance with the present invention can be used to create a large scale design on a poured concrete structure. FIG. 10 illustrates concrete column 70 having surface 72 made up of three design elements: design element 80 derived from a master form corresponding to mold box 34 as shown in FIG. 3; design element 82 derived from mold box 16 (FIG. 1) via master form 29; and design element 84 derived from master form 50 shown in FIG. 8. Each design element is preferably produced from a single form liner derived from the appropriate master form.

While preferred embodiments of the invention have been illustrated, variations will be apparent to those skilled in the art. Accordingly, the scope of the invention is to be determined by reference to the following claims.

The embodiments of the invention in which an exclusive property or privilege is claimed are defined as follows:

1. A method of producing an elastomeric form liner useful for creating a design on a surface of a poured concrete structure, the method comprising the steps of:
   (a) cutting at least one tire tread segment having a first surface defining a geometric pattern of tread channels from a vehicle tire;
   (b) positioning the tire tread segment in a mold box;
   (c) pouring a liquid elastomeric material over the first surface of the tire tread segment and into the tread channels and allowing the elastomeric material to solidify in the mold box into an elastomeric form liner; and
   (d) separating the elastomeric form liner from the tire tread segment.

2. The method of claim 1, comprising the additional step of applying a releasing agent to the tire tread segment before the pouring step.

3. The method of claim 2, comprising the additional step of removing undercutting from the form liner after said separating step.

4. A method of producing an elastomeric form liner useful for creating a design on the surface of a poured concrete structure, the method comprising the steps of:
   (a) cutting at least one tire tread segment having a first surface defining a geometric pattern of tread channels from a vehicle tire;
   (b) positioning the tire tread segment in a first mold box;
   (c) pouring a liquid elastomeric material over the tire tread segment and into the tread channels and allowing the elastomeric material to solidify in the first mold box into a first elastomeric form having an outer surface defining a negative of the first surface of the tire tread segment;
   (d) separating the first elastomeric form from the tire tread segment; and
   (e) using the first elastomeric form as a mold to produce the elastomeric form liner.

5. The method of claim 4, wherein the step of using the first elastomeric form to prodouce the elastomeric form liner comprises the steps of:
   (i) positioning the first elastomeric form in a second mold box;
   (ii) flowing a liquid elastomeric material over the outer surface of the first elastomeric form in the second mold box and allowing the elastomeric material to solidify into a second elastomeric form; and
   (iii) separating the second elastomeric form liner from the first elastomeric form.

6. The method of claim 5, comprising the additional steps of applying a releasing agent to the tire tread segment before the first pouring step, and applying a releasing agent to the first elastomeric form prior to the second pouring step.

7. The method of claim 5, comprising the additional step of removing undercutting from the first elastomeric form after the first separating step.

8. The method of claim 4, wherein two or more tire tread segments derived from two or more vehicle tires are positioned in the mold box, such that the elastomeric form liner contains geometric tread patterns corresponding to both tire tread segments.

9. A method of producing an elastomeric form liner useful for creating a design on the surface of a poured concrete structure, the method comprising the steps of:
   (a) cutting at least one tire tread segment having a first surface defining a geometric pattern of tread channels from a vehicle tire;
   (b) positioning the first tire tread segment in a first mold box;
   (c) pouring a liquid elastomeric material over the first surface of the first tire tread segment and into the tread channels and llowing the elastomeric material to solidify in the first mold box into a first elastomeric form havinag an outer surface defining a negative of the first surface of the first tire tread segment;
   (d) separating the first elastomeric form from the first tire tread segment;
   (e) repeating steps (a)-(d) for a second tire tread segment having a second surface defining a geometric pattern of tread channels to produce a second elastomeric form having an outer surface defining a negative of the second surface of the second tire tread segment;
   (f) positioning the first and secoand elastomeric forms in a second mold box;
   (g) pouring liquid elastomeric material over the first and second elastomeric forms in the second mold box and allowing the elastomeric material to solidify into a third elastomeric form;
   (h) separating the third elastomeric form from the first and second elastomeric forms; and
   (i) using the third elastomeric form as a mold to produce the form liner.

10. The method of claim 9, comprising the additional step of applying a releasing agent to the tire tread before the first pouring step, and applying a releasing agent to each form prior to each subsequent pouring step.

11. The method of claim 9, comprising the additional step of removing undercutting from the first and second elastomeric forms after the separating steps for the respective forms.

* * * * *

UNITED STATES PATENT AND TRADEMARK OFFICE
CERTIFICATE OF CORRECTION

PATENT NO. : 5,057,258
DATED : October 15, 1991
INVENTOR(S) : V. B. Scuri It is certified that error appears in the above-identified patent and that said Letters Patent is hereby corrected as shown below:

| COLUMN | LINE | |
|---|---|---|
| [57] | 2 | "patterning" should be --pattering-- |
| 1 | 41 | "avilable" should be --available-- |
| 2 | 45 | "modeling" should be --Modeling-- |
| 3 | 18 | "emmbodiment" should be --embodiment-- |
| 4 | 1 and 2 | "conbi-nations" should be --combinations-- |
| 4 | 20 | "coresponding" should be --corresponding-- |
| 6 | 13 | "llowing" should be --allowing-- |
| 6 | 15 | "havinag" should be --having-- |

Signed and Sealed this

Thirtieth Day of March, 1993

*Attest:*

STEPHEN G. KUNIN

*Attesting Officer*          Acting Commissioner of Patents and Trademarks